(12) United States Patent
Takahashi et al.

(10) Patent No.: US 6,842,069 B2
(45) Date of Patent: Jan. 11, 2005

(54) ACTIVE COMMON MODE EMI FILTERS

(75) Inventors: Toshio Takahashi, Rancho Palos Verdes, CA (US); Brian Pelly, Tehachapi, CA (US)

(73) Assignee: International Rectifier Corporation, El Segundo, CA (US)

( * ) Notice: Subject to any disclaimer, the term of this patent is extended or adjusted under 35 U.S.C. 154(b) by 0 days.

(21) Appl. No.: 10/426,123

(22) Filed: Apr. 29, 2003

(65) Prior Publication Data

US 2003/0210563 A1 Nov. 13, 2003

Related U.S. Application Data

(60) Provisional application No. 60/376,643, filed on Apr. 30, 2002, and provisional application No. 60/378,201, filed on May 3, 2002.

(51) Int. Cl.$^7$ .............................................. H03K 5/00
(52) U.S. Cl. ......................... 327/552; 363/37; 363/39
(58) Field of Search ........................ 327/551, 552, 327/555, 556, 557, 558, 559, 311; 363/48, 37, 39, 47, 40, 44; 315/307, 247, DIG. 5

(56) References Cited

U.S. PATENT DOCUMENTS

| 4,730,243 | A | | 3/1988 | Glennon | 363/44 |
|---|---|---|---|---|---|
| 5,012,058 | A | | 4/1991 | Smith | 219/10.55 |
| 5,757,628 | A | * | 5/1998 | Kamata | 361/40 |
| 5,831,842 | A | * | 11/1998 | Ogasawara et al. | 363/40 |
| 6,636,107 | B2 | * | 10/2003 | Pelly | 327/552 |

OTHER PUBLICATIONS

PCT International Search Report dated Sep. 16, 2003.

* cited by examiner

*Primary Examiner*—Dinh T. Le
(74) *Attorney, Agent, or Firm*—Ostrolenk, Faber, Gerb & Soffen, LLP (57) ABSTRACT

An active EMI filter for reducing common mode noise current in a circuits, comprising: a transistor stage having two transistors coupled in series, a current sensor for sensing the common mode noise current, the current sensor having an output driving the transistor stage, whereby each of the transistors is driven in response to the common mode noise current, a capacitor coupling the transistor stage and the ground return line, the capacitor providing a cancellation current to cancel the common mode noise current, the current sensor comprising a current transformer having a primary coupled with the circuit having the common mode noise. The current sensor and the transistor stage may be coupled in a feed forward arrangement wherein the transistor stage and the current sensor have an amplitude gain of approximately unity; or in a feedback arrangement wherein the transistor stage and current sensor provide high gain.

25 Claims, 7 Drawing Sheets

FIG. 1A PRIOR ART

FEEDBACK
- HIGH GAIN SYSTEM
- POSSIBLE OSCILLATION
- MODERATE CT SIZE
- LOW S/N (DIFFERENTIAL CT)

FEED FORWARD
- UNITY GAIN SYSTEM
- GOOD STABILITY
- SMALL CT SIZE
- HIGH S/N (DIFFERENTIAL CT)

FIG. 4B $i_{COMIN} = i_{COMOUT} - G\, i_{COMOUT}$
$= 0$ FOR $G = 1$

FIG. 6

$i_{COMIN} = i_{COMOUT} / (1+G)$
$= 0$ FOR $G = \infty$

ACTIVE COMMON MODE EMI FILTERS

CROSS-REFERENCE TO RELATED APPLICATIONS

This application is based upon and claims priority of U.S. Provisional Application Ser. No. 60/376,643 filed Apr. 30, 2002 (IR-2166), and U.S. Provisional Application Ser. No. 60/378,201 filed May 3, 2002 (IR-2222/2224), the disclosures of which are incorporated by reference herein.

BACKGROUND OF THE INVENTION

1. Field of the Invention

The invention relates to active common mode EMI filter circuits using bipolar transistors or MOSFETs in combination with common mode current sensing transformers.

2. Background Art

Various circuits of this type, having a unity gain amplifier in a feedforward configuration, or a high-gain amplifier in a feedback configuration, have previously been disclosed.

Active EMI filters are known and are described, for example, in co-pending applications Ser. No. 09/816,590, filed Mar. 23, 2001 entitled ACTIVE FILTER FOR REDUCTION OF COMMON MODE CURRENT (IR-1744), and Ser. No. 10/336,157, filed Jan. 2, 2003, entitled ACTIVE EMI FILTER WITH FEED FORWARD CANCELLATION (IR-2146), the disclosures of which are incorporated herein by reference.

Active EMI filter circuits may use the feed forward design as disclosed in the above noted application Ser. No. 09/816,590. See FIGS. 1A and 1B. The feed forward design, shown in FIG. 1B, has fundamentally superior performance characteristics over the traditional feedback design, which is shown in FIG. 1A.

Figure 1:
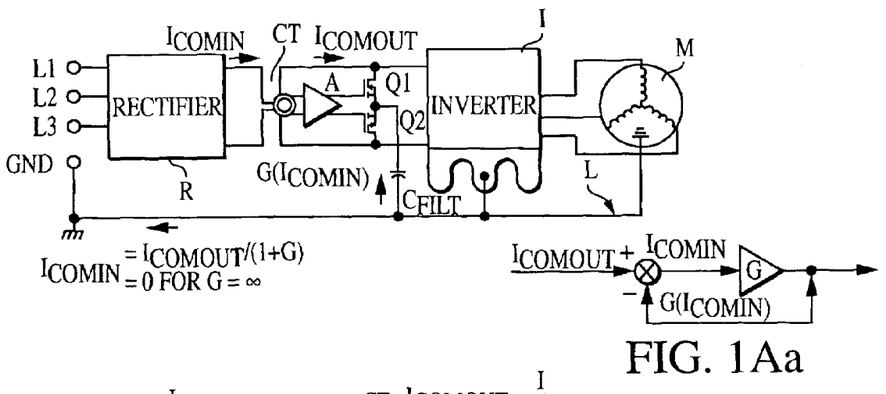
Figure 1A:
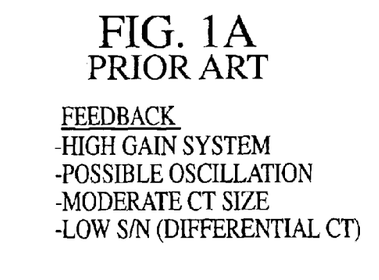
FIGS. 1A and 1Aa show respectively a prior art feedback-type active common mode EMI filter and an equivalent circuit thereof.

FIG. 1A shows the prior art feedback configuration. In the feedback configuration of the active EMI noise filter for reducing common mode current, the noise sensor may comprise, for example, a current transformer CT which has two primaries each coupled to a respective leg of the DC bus fed rectified DC current by a rectifier circuit R from the AC mains. Each primary is coupled in series with the respective DC bus. Each DC bus is coupled to an inverter I which is controlled to provide three phase AC current to a load, e.g., an electric motor M.

The secondary winding of the current transformer CT is coupled to an amplifier A. The common mode current is the noise current that flows in common in the same direction in both legs of the DC bus to the inverter and is caused by intrinsic reactive components (typically capacitive) between the motor windings and the motor case and/or inverter heat sink. Without filtering via capacitor $CF_{FILT}$, this common mode current will be returned to the mains network ground GND and reflected as undesirable noise currents on the AC mains. The aim of the active EMI filter circuit is to provide a path for the common mode current via capacitor $C_{FILT}$ though an active switching circuit back to the DC bus and hence contain the common mode current as a circulating current in the DC bus, inverter and motor and prevent its conduction back to the AC network. The common mode current returned to ground GND is thus canceled.

The amplifier A outputs of FIG. 1A control two complementary transistors Q1 and Q2 to shunt common mode current through the capacitor $C_{FILT}$ from the ground line L connecting the motor case and ground. The common mode current to be minimized comprises a commonly polarized current which flows in each leg of the DC bus through the inverter to the motor M and is attributable to current flows between the windings of the motor and the motor case/inverter heat sink due to the internal intrinsic capacitances. The common mode current then flows back through the ground line and would ordinarily flow to ground. This would create unnecessary noise currents and harmonics on the AC lines. In order to minimize these currents, passive filters have been used in the past to shunt the common mode current. FIG. 1A shows a prior art active feedback filter arrangement in which the common mode current is shunted by the capacitor $C_{FILT}$ through either transistor Q1 or Q2, depending upon which transistor is turned on (which depends on the common mode current flow direction at a particular instant), back to the DC bus, thereby eliminating the common mode current returned to ground, and thereby minimizing noise currents reflected in the AC lines. However, the system shown in FIG. 1A requires the amplifier A and current transformer to have high gain in order to minimize the common mode current returned to ground. Theoretically, the gain of the system is required to be infinite to have the common mode current returned to ground equal to zero, as shown by the equations in FIG. 1A and the equivalent circuit of FIG. 1Aa. This results in possible oscillation of the system and furthermore requires a current transformer of moderate size. Furthermore, the signal to noise ratio is low, consistent with the need for the high gain amplifier.

Figure 1B:
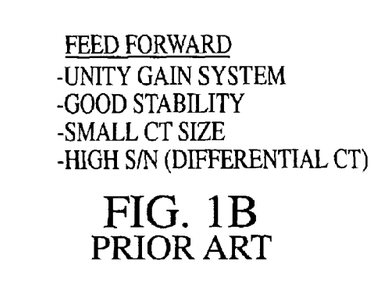
FIGS. 1B and 1Ba show respectively a prior art feedforward-type active common mode EMI filter and an equivalent circuit thereof.

In contrast, with the feed forward arrangement as shown in FIG. 1B, and the equivalent circuit of FIG. 1Ba, the common mode current returned to ground GND from line L is theoretically zero for a system gain equal to 1. Accordingly, the amplifier gain is easy to attain, the system has excellent stability and because of the high signal to noise ratio, a relatively small current transformer can be utilized. Accordingly, the feed forward design shown in FIG. 1B has significant advantages because the current transformer can be of significantly smaller size, the amplifier is easier to embody and the system has good stability and is free from oscillation.

Figure 2A:
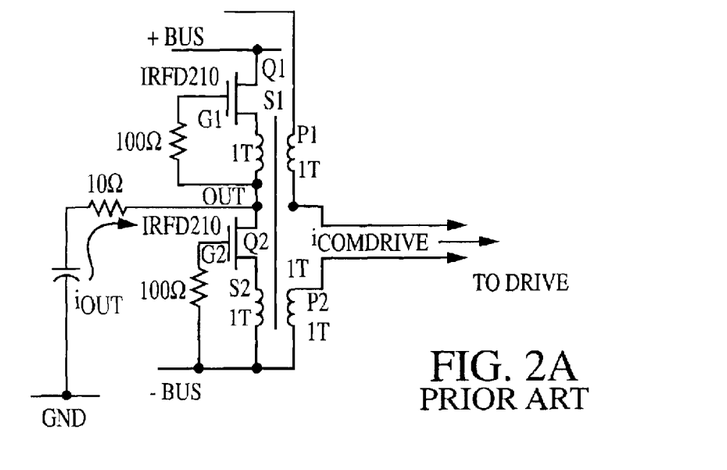
FIGS. 2A and 2B show respectively a third prior art active common mode EMI filter and a series of graphs showing the operation thereof.

Another example of a previously disclosed circuit, which uses two N-Channel MOSFETs, and a current-sensing transformer with 1-turn primaries and secondaries, is shown in FIG. 2A. This circuit is potentially attractive over circuits that use bipolar transistors or P-channel MOSFETs, because N-channel MOSFETs are available with voltage ratings that are higher than those of bipolar transistors or P-channel MOSFETs. The MOSFET's greater ruggedness versus bipolar transistors is also advantageous. For even higher voltage, IGBTs might be preferred over MOSFETs, because of their higher transconductance and higher peak current capability.

A problem with MOSFETs or IGBTs, however, is that the gate to source drive voltage needed to deliver the required output current is relatively high. For example, the peak gate-source voltage required to drive a 200V IRFD210 HEXFET to an output current of 2.5 A peak is about 6.5V. A 500V IRF820 would require about the same gate-source voltage for 2.5 A peak output current.

The gate-source voltage for the MOSFET is induced across the secondary windings S1 (for Q1) and S2 (Q2) of the current sensing transformer. For this unity current gain feedforward configuration the primary to secondary turns ratio must, by definition, be 1.0. The voltage induced across the primary winding is thus the same as the secondary voltage; in the above examples, this voltage would be about 6.5V.

Unfortunately, the higher the voltage across the primary, the greater the magnetizing component of the primary current. Since the current that flows in the secondary is equal to the total primary current less the magnetizing component, the greater the voltage across the primary, the greater the error between the secondary current—which is the output current of the active filter—and the primary current. The greater the error between the output current of the active filter and the primary common mode current, the poorer the performance of the active filter.

Figure 2B:
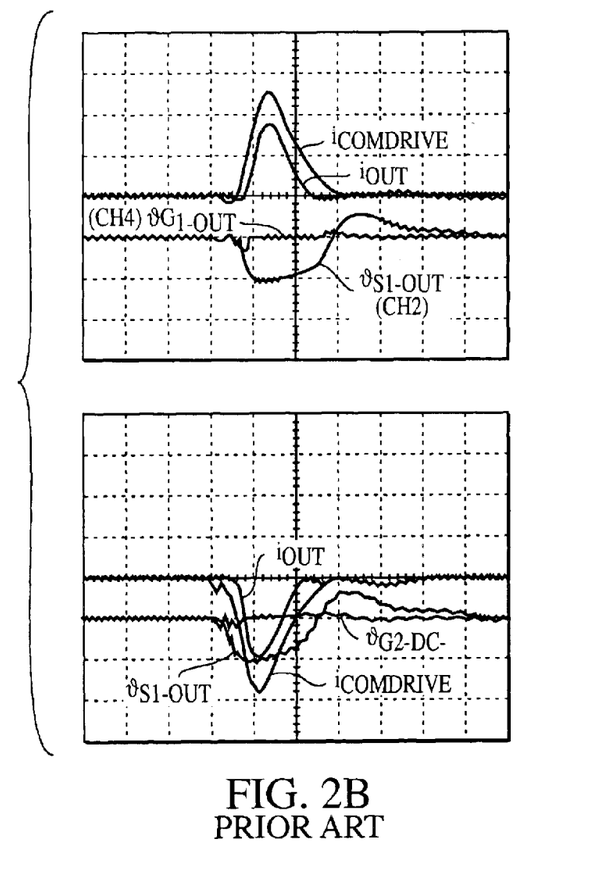

FIG. 2B shows waveforms of iCOMDRIVE and the output current, iOUT of the active filter, with one primary and one secondary turn, on a Magnetics ZW-42507 toroid ferrite core. A significant error exists between iOUT and ICOMDRIVE.

Figure 2C:
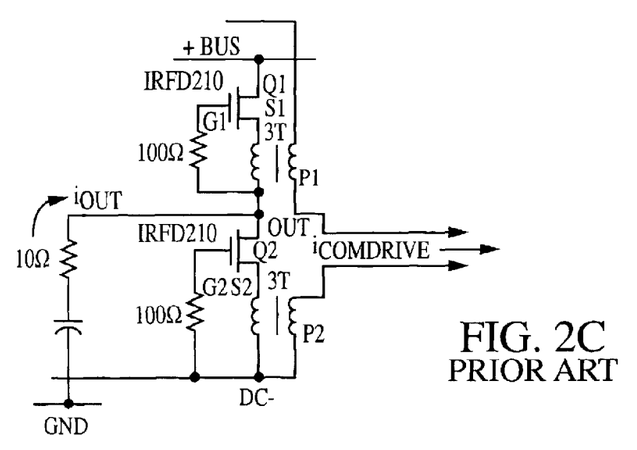
FIGS. 2C and 2D show respectively a fourth prior art active common mode EMI filter and a series of graphs showing the operation thereof.

A way of minimizing the error due to the magnetizing current, shown in FIG. 2C, is to increase the number of turns on the current sensing transformer—keeping a 1:1 ratio between the primary and secondary turns, in order to preserve unity current gain. In this example, each winding has 3 turns. Since the voltage across the winding is set by the gate-source voltage of the MOSFET, and therefore is fixed regardless of the number of turns, the magnetizing component of current decreases in inverse proportion to the square of the number of turns (because the magnetizing inductance is proportional to the square of the turns).

Figure 2D:
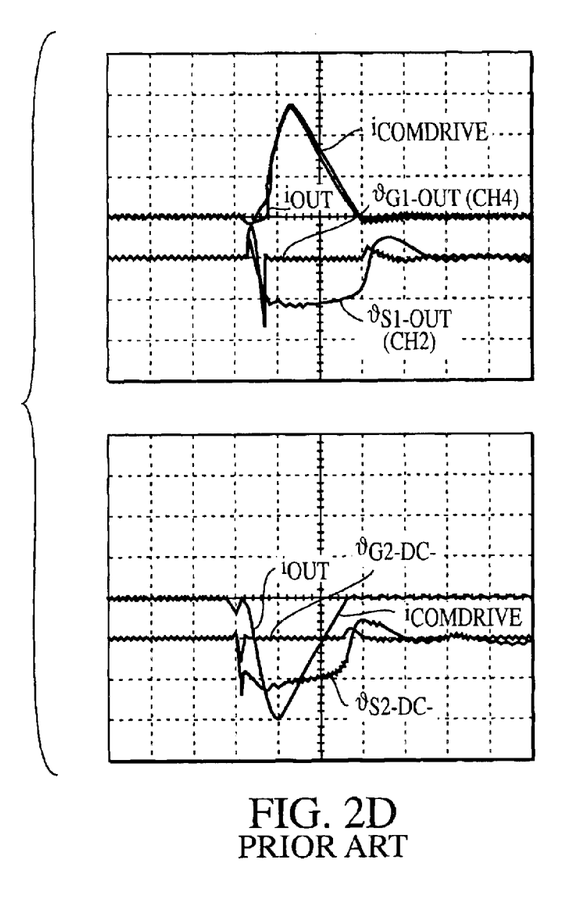

FIG. 2D shows corresponding waveforms with three primary and three secondary turns. The error between iOUT and iCOMDRIVE has been substantially reduced. The disadvantage is that a multiple turn hand-wound primary is now needed.

It is desirable, however, for the number of primary turns to be minimized. Optimally, just a single primary wire, running through the center of a toroid (i.e., a single 'turn') is desired. The reason is that the primary wire must have relatively large diameter, because it must be rated to carry the full normal-mode current. A multiple turn primary of large diameter wire has to be hand-wound onto the toroid, and this is expensive.

Figure 3:
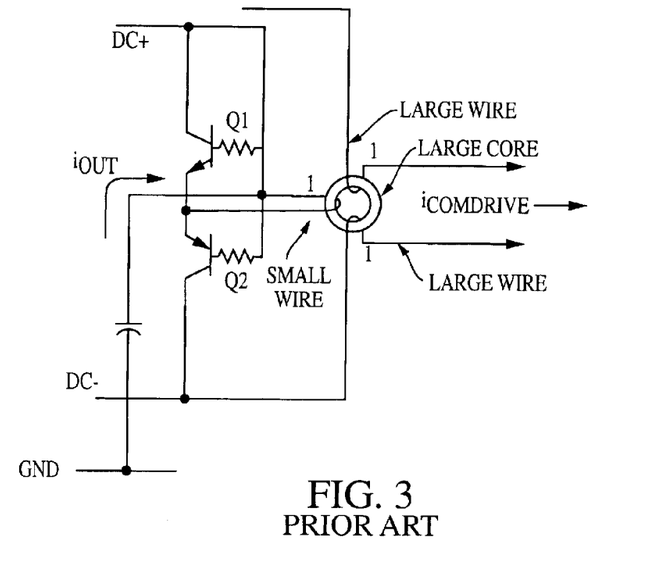
FIG. 3 shows a fifth prior art active common mode EMI filter.

Another known configuration of an active common mode filter, using bipolar transistors, is shown in FIG. 3. Like the circuits in FIGS. 2A and 2C, this is a "feedforward" circuit, which has unity gain between iOUT and iCOMDRIVE.

It is desirable for the primary winding on the common mode sensing transformer to be a single wire that passes through the center of the magnetic core. The reason is that the primary winding has relatively large cross section, because it carries the full normal mode current of the drive. The secondary current of the CT is a signal that represents just the common mode current, and has low average value. Thus, the secondary wire can have much smaller cross-section than the primary.

Since the current gain must be unity, a single primary 'turn' on the current sensing transformer requires that the secondary also have just one 'turn'. Unfortunately, a single-turn current-sensing transformer requires a magnetic core with an inconveniently large cross-section. The reason is that the voltage developed across the secondary, hence also the primary voltage, is essentially the base-emitter voltage of the transistors Q1/Q2 (because the turns ratio is 1.0). This voltage is typically about 1V. This voltage developed across the one-turn primary creates a significant component of magnetizing current, because the magnetizing inductance of one turn is relatively low—unless the cross section of the core is made inconveniently large.

The magnetizing component of common mode current in the primary is not transmitted to the secondary, thus it becomes an "error" in the output current iOUT of the amplifier. This degrades the performance of the active filter.

In order to use a small inexpensive common mode current sensing transformer with just one primary turn, it is necessary to find a way of reducing the voltage developed across the primary, thus of reducing the magnetizing current.

One approach is to create an offsetting bias voltage in the base-emitter circuit of the transistors, which cancels the base-emitter threshold voltage, as described below in connection with FIG. 4(a). This approach accurately matches the bias voltage to the base-emitter voltage of the transistors over the required range of operating temperature.

Another approach (not shown in the drawings) is to use multiple turns on the secondary of a one-turn primary sensing transformer. The voltage reflected back to the primary winding is now $V_{b-e}/N$, where N is the number of secondary turns. The primary component of magnetizing current, relative to the total common mode primary current, is now reduced by $1/N$. The ratio of error to signal of the secondary current is thus also reduced by $$\frac{1}{N},$$

though the absolute amplitude of the secondary current is also reduced by $$\frac{1}{N}$$

i.e. the secondary current is a relatively more accurate, yet miniaturized, replica of the primary current.

However, since the overall current gain from iCOMDRIVE to iOUT must be unity, some form of current amplifier, such as a current mirror circuit, designed to have current gain of N, is required to restore equality between iOUT and iCOMDRIVE. A problem with this type of current mirror is that it has inaccuracies due to tolerances in the matching of impedances and/or transistor characteristics.

SUMMARY OF THE INVENTION

Accordingly, according to a first aspect of the invention, an arrangement for reducing the error caused by transistor threshold voltage in an active common mode filter employs a common mode current sensing transformer with a single primary turn. More generally, the primary and secondary of the current transformer each have the same number of turns, preferably a single turn; and another secondary or "overwinding" is provided to boost a bias voltage applied to the control electrode of each transistor. This arrangement is especially useful where it is required to use MOSFETs or IGBTs in high voltage, high current systems, for which suitably rated bipolar transistors are not available.

According to a second aspect of the invention, a circuit arrangement permitting the sensing transformer to have a one turn primary and a multiple turn secondary comprises a second current amplifier at the secondary which does not rely for its accuracy on matching of impedances or transistor characteristics. Instead, sufficient accuracy is obtained by providing the second current transformer with a correct number of turns.

A third aspect of the invention relates to a new method of generating bias power supply for the active EMI filter circuits shown in FIGS. 1A and 1B. The floating power supply can be derived from the common mode noise, which the active EMI filter is intended to cancel, utilizing the same current transformer. In one embodiment, no additional winding is required. Since the power source of the bias floating power supply is the common mode noise, the power supply voltage is approximately proportional to noise amplitude. As the noise increases, the bias power supply voltage increases, resulting in more effective filtering action. This effectively reduces common mode noise, therefore reducing bias power supply voltage in response to the lower noise canceling action that is required. Therefore the overall circuit provides a closed loop action between canceling noise and noise generated power supply.

Other features and advantages of the present invention will become apparent from the following description of embodiments of the invention, which refers to the accompanying drawings.

DETAILED DESCRIPTION OF EMBODIMENTS OF THE INVENTION

First Embodiment

Figure 4A:
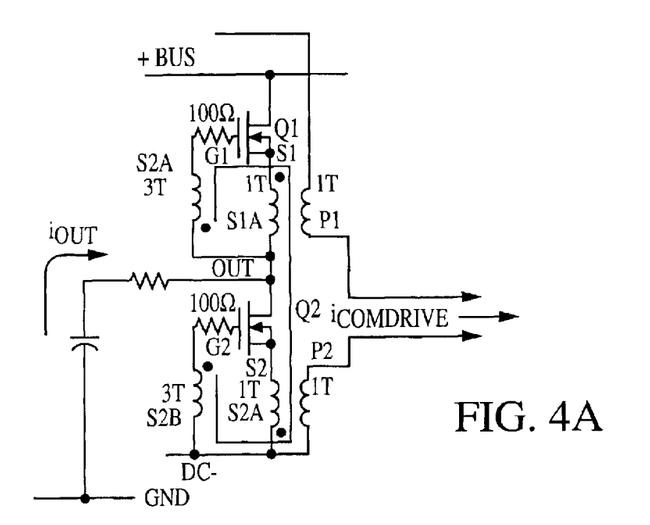
FIG. 4(a) shows an active common mode EMI filter according to a first embodiment of the invention, and FIG. 4(b) contains a series of graphs showing the operation thereof.

The proposed solution that allows a single turn primary is illustrated in FIG. 4(a). The primary windings P1 and P2 (of "large" diameter wire) and secondary windings S1A and S2A (of "small" diameter wire), each have one turn, thus fulfilling the requirement for just a single turn primary. "Overwindings" S1B and S2B, also of "small" diameter wire, are added, to boost the voltage applied between gate and source of the MOSFET, relative to the primary voltage.

Since the required gate-source drive voltage for a given primary current is fixed by the characteristics of the MOSFET, the voltage across each primary winding is now reduced in the ratio of $$\frac{1}{1+N},$$

where N is the number of "overwind" turns on S1B and S2B relative to the number of primary turns. Thus, the magnetizing current error is reduced in the same ratio.

Figure 4B:
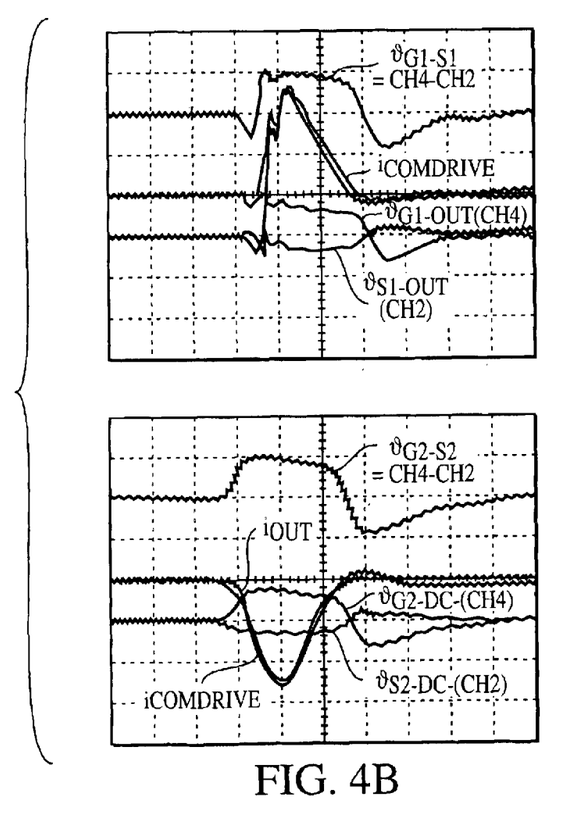

FIG. 4(b) shows waveforms of iCOMDRIVE and iOUT, with one primary turn and N=3. The error between iOUT and iCOMDRIVE has been significantly reduced, as compared with the waveforms in FIG. 1(b).

Second Embodiment

Figure 5:
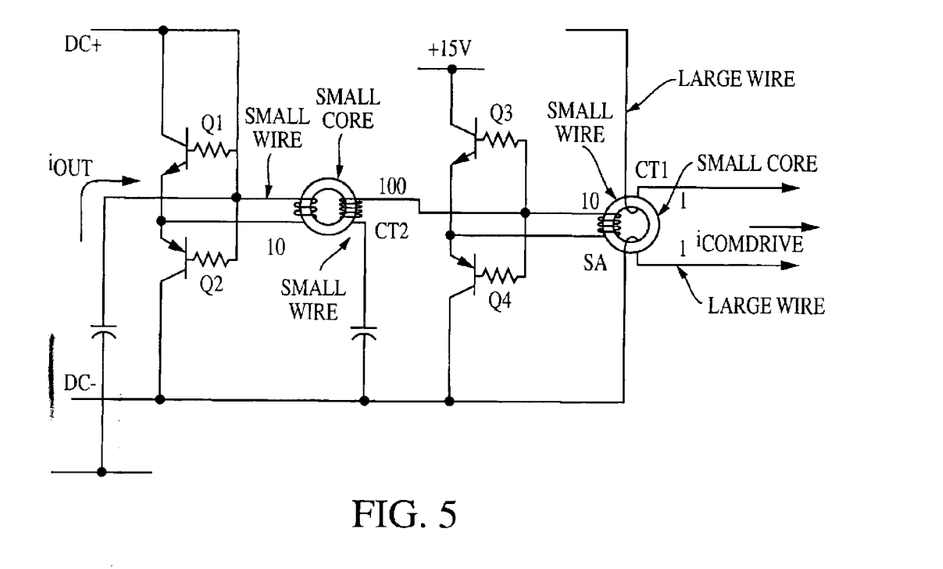
FIG. 5 shows an active common mode EMI filter according to a second embodiment of the invention.

The second embodiment is illustrated by the example in FIG. 5. Here, there are 10 secondary turns on the 1-turn primary sensing transformer, CT1. The relative magnetizing current error is thus 1/10 of what it would be with just a single secondary turn on the same core. The current that flows in the secondary SA, and in the 100-turn primary winding of a second small current transformer CT2, is thus a relatively accurate replica of the primary current, but with amplitude of one tenth of the primary current. CT2 carries only "common mode" current, therefore it has small wire size for both primary and secondary windings.

CT2 has 10 secondary turns. Thus, the secondary current of CT2 is 10× the primary current, and the current gain of the overall circuit from iCOMDRIVE to iOUT has the desired value of unity.

The voltage reflected to the primary of CT2 is 10× the base-emitter voltage of Q1/Q2 i.e. about 10V. Assuming CT2 has the same cross section as CT1 (but not necessarily as large a core diameter, because of the small wire size on CT2), the magnetizing inductance of CT2 will be about 10,000× that of CT1—because magnetizing inductance is proportional to the square of the number of turns. Thus, though the primary voltage of CT2 is about 10V, and the primary current of CT2 is about 1/10×iCOMDRIVE, the magnetizing current error introduced by CT2 is still only about 1/100× the error in the circuit of FIG. 3.

Note that since the voltage across the primary of CT2 is about 10V, the bus voltage for Q3/Q4 need only be about 15V. Both the voltage and current handled by Q3/Q4 is thus small and the power dissipation is very small.

Note also that by making a small adjustment to the number of primary turns on CT2, the small error that occurs between iOUT and iCOMDRIVE due to finite current gain of Q1 through Q4 can—at least roughly—be compensated. For example, if a 1% error occurs between iOUT and iCOMDRIVE due to transistor gain, this can be compensated simply by increasing the number of primary turns on CT2 from 100 to 101.

Third Embodiment

Figure 6:
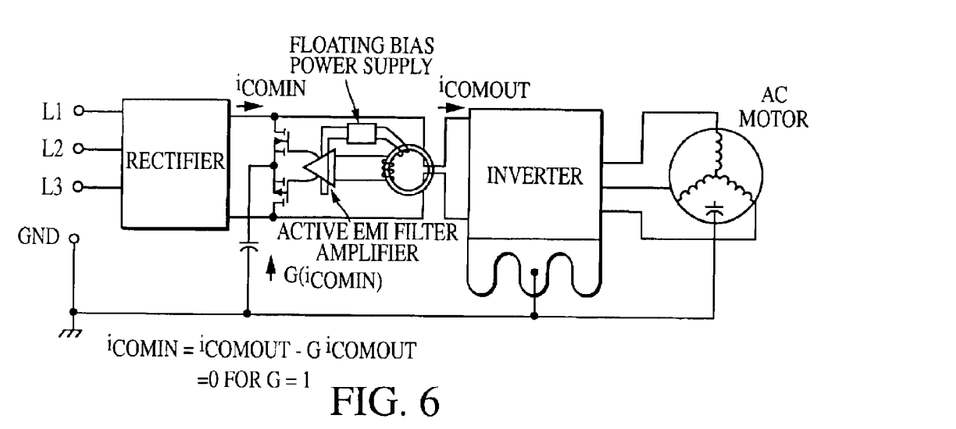
FIG. 6 shows a feed-forward-type active common mode EMI filter according to a third embodiment of the invention.
Figure 7:
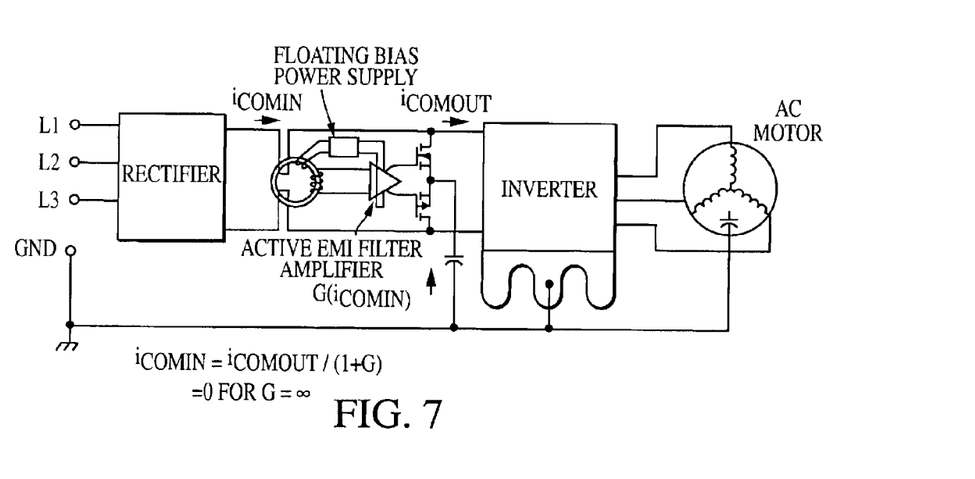
FIG. 7 shows a feedback-type active common mode EMI filter according to the third embodiment.

FIG. 6 is a basic diagram of a noise powered noise canceling active EMI filter. The active filter method is based on the feedforward noise canceling method of FIG. 1B. FIG. 7 is a basic diagram of a noise powered noise canceling filter based on the feedback noise canceling method of 1A. The floating bias power supply provides bias voltage to the active EMI filter amplifier in either the feedback or the feedforward circuit. The embodiments of FIGS. 6 and 7 each include a CT which has a winding for noise sensing that is separate from the winding for the floating power supply.

In FIGS. 6 and 7 the noise powered active EMI filter is applied to AC motor inverter system. In both cases, the AC line is three phase input (L1, L2, L3) along with ground terminal, GND. It can be a single phase AC line as well. In general, the noise powered active EMI filter can be applied to any system which contains power switching device(s)

and/or forms a power inverter such as a switch mode power supply, uninterruptible power supply (UPS), welding inverter system, etc. Therefore, any circuit that has a power switching device can take advantage of this noise powered active EMI filter.

Figure 8:
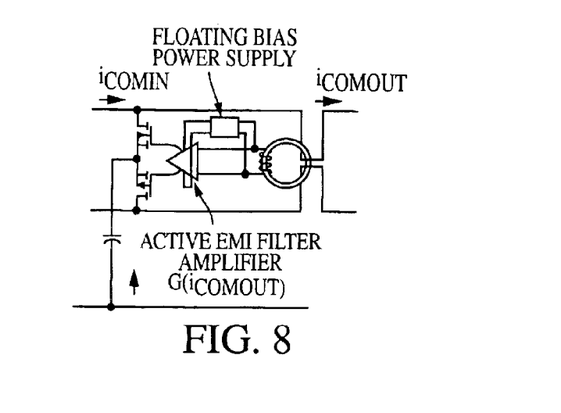
FIG. 8 shows a modification of the circuit of FIG. 6.

FIG. 8 shows an embodiment of the noise powered active EMI filter which does not require a dedicated winding for a bias power supply, but rather shares the same winding that is used for noise sensing and is fed to the amplifier.

Figure 9:
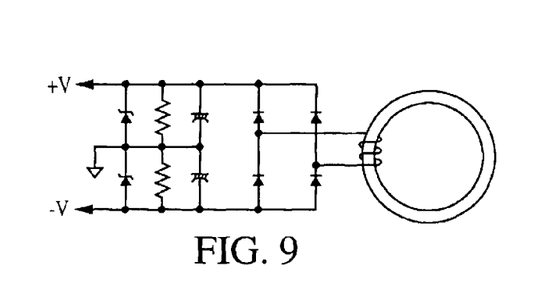
FIGS. 9 and 10 show respectively full-wave and a half-wave bridge rectifier which are usable in the circuits of FIGS. 6–8.
Figure 10:
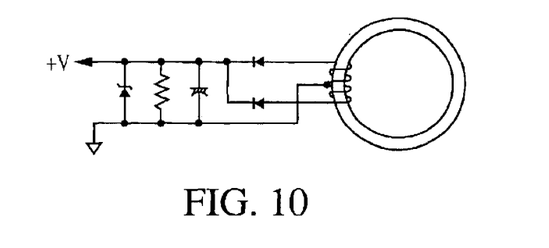

FIGS. 9 and 10 show examples of the floating bias power supply circuit. FIG. 9 has a full bridge rectifier and provides a bipolar power supply, while FIG. 10 shows a half bridge rectifier and provides a one-sided power supply. These are non-limiting examples. Any other form of power supply can be constructed by properly arranging components such as rectifying diodes depending on application needs.

Figure 11:
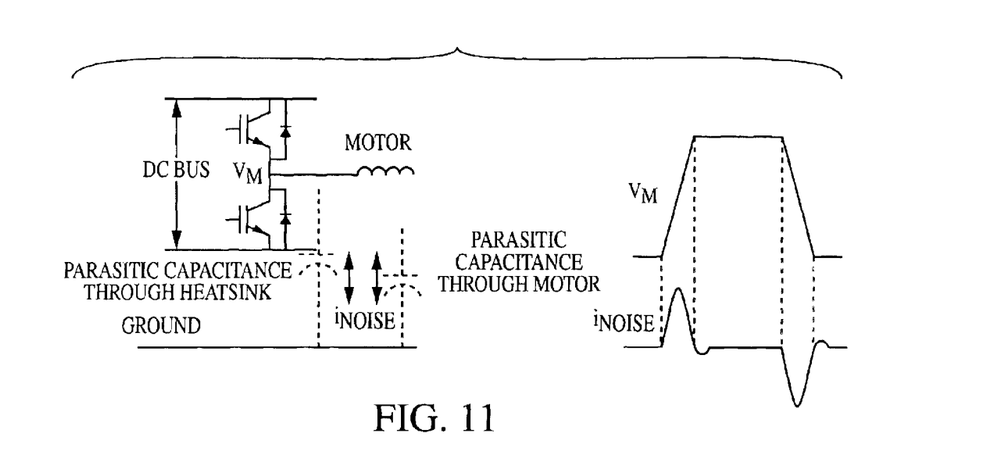
FIG. 11 shows a typical waveform of common mode noise current.

A typical waveform of common mode noise current is shown in FIG. 11. For example, in a 2 kW AC motor inverter drive, its amplitude reaches 2–3 A peak with a duration period of 200 nsec to one microsecond. Noise current is generated when a fast switching event occurs and its switching dv/dt couples with parasitic capacitance to the ground. Therefore, the noise current is synchronous with the switching event of the motor phase voltage and both positive and negative current appear on the ground.

Although the present invention has been described in relation to particular embodiments thereof, many other variations and modifications and other uses will become apparent to those skilled in the art. Therefore, the present invention is not limited by the specific disclosure herein.

What is claimed is:

1. An active EMI filter for reducing common mode noise current in a circuit comprising a rectifier coupled to an AC network, the rectifier supplying DC power to a DC bus, the DC bus feeding an inverter stage for providing AC power to a load, the load having a ground return line to a ground connection of the AC network, the active filter comprising:
    a transistor stage comprising two transistors coupled in series;
    a current sensor for sensing the common mode noise current in said circuit, said current sensor comprising a current transformer having a primary coupled to a branch of said circuit in which common mode noise occurs;
    the current sensor having an output coupled to the transistor stage, the transistor stage being driven by said current sensor in response to the common mode noise current;
    a capacitor coupling said transistor stage and said ground return line;
    said capacitor providing a cancellation current to said ground return line from said transistor stage to substantially cancel the common mode noise current in the ground return line;
    one of said two transistors of said transistor stage being coupled such that a respective main electrodes thereof is coupled to a respective legs of said circuit in which common mode noise occurs, another corresponding main electrode of said transistor being coupled by a respective secondary of said current transformer to a common node, and the control electrode of said transistors is coupled by another respective secondary of said current transformer to said common node; and
    the other of said two transistors being counted such that a respective main electrode thereof is coupled to said common node, another corresponding main electrode of said transistor being coupled by another corresponding secondary of said current transformer to another leg of said circuit in which common mode noise occurs, and the control electrode is coupled by another respective secondary to said other leg of said circuit.

2. The active filter of claim 1, wherein said current sensor and said transistor stage are coupled in a feed forward arrangement, wherein said transistor stage and said current sensor have an amplitude gain of approximately unity.

3. The active filter of claim 1, wherein the two transistors are MOSFETs.

4. The active filter of claim 3, wherein said MOSFETs are of the same type.

5. The active filter of claim 1, wherein said capacitor couples said ground return line to the common node of said transistors.

6. The active filter of claim 1, wherein said other secondaries of said current transformer provide bias circuits for applying respective bias voltages to the control electrodes of said two transistors.

7. The active filter of claim 1, wherein said primary and said secondary of said current transformer have the same number of turns.

8. The active filter of claim 7, wherein said primary and said secondary of said current transformer each have a single turn.

9. The active filter of claim 7, wherein said other secondary has a greater number of turns than said primary.

10. An active EMI filter for reducing common mode noise current in a circuit comprising a rectifier coupled to an AC network, the rectifier supplying DC power to a DC bus, the DC bus feeding an inverter stage for providing AC power to a load, the load having a ground return line to a ground connection of the AC network, the active filter comprising:
    a transistor stage comprising two transistors coupled in series;
    a current sensor for sensing the common mode noise current flowing in said circuit, the current sensor having an input coupled to a branch of said circuit in which common mode noise occurs and an output driving the transistor stage, the two transistors of the transistor stage being driven by said output of the current sensor in response to the common mode noise current;
    a capacitor coupling said transistor stage and said ground return line;
    said capacitor providing a cancellation current to said ground return line from said transistor stage to substantially cancel the common mode current in said ground return line;
    said current sensor comprising a first current transformer having a primary coupled to said circuit branch in which common mode current occurs, and a second current transformer having a primary coupled to a secondary of the first current transformer;
    said two transistors of said transistor stage each having two main electrodes and one control electrode, one main electrode of each transistor being coupled in common to one end of a secondary of said second current transformer, a control electrode of each transistor being coupled in common to another end of the secondary of said secondary current transformer.

11. The active filter of claim 10, wherein the two transistors are bipolar transistors.

12. The active filter of claim 11, wherein the emitters of the two transistors are connected together.

13. The active filter of claim 10, wherein the two transistors are complementary.

14. The active filter of claim 13, wherein the emitters of the two transistors are connected together.

15. The active filter of claim 10, wherein said current sensor and said transistor stage arc coupled in a feed forward arrangement wherein said transistor stage and said current sensor have an amplitude gain of approximately unity.

16. The active filter of claim 10, wherein said capacitor connects said ground return line in common to the control electrodes of said two transistors.

17. The active filter of claim 10, further comprising third and fourth transistors, each having two main electrodes, one main electrode of each of said third and fourth transistors being connected in common to one end of said secondary of said first current transformer, and each having a control electrode, said control electrodes of said third and fourth transistors being coupled in common to another end of said secondary of said first current transformer.

18. The active filter of claim 17, wherein the other main electrodes of said third and fourth transistors are connected across a DC supply voltage.

19. The active filter of claim 10, wherein said first current transformer has a step-up turns ratio and said second current transformer has a step-down turns ratio.

20. An active EMI filter for reducing common mode noise current in a circuit comprising a rectifier coupled to an AC network, the rectifier supplying DC power to a DC bus, the DC bus feeding an inverter stage for providing AC power to a load, the load having a ground return line to a ground connection of the AC network, the active filter comprising:

a transistor stage comprising two transistors coupled in series;

a current sensor for sensing the common mode noise current in said circuit, said current sensor comprising a current transformer having a primary coupled to a branch of said circuit in which common mode noise occurs;

the current sensor having an output coupled to an amplifier, the transistor stage being driven by said amplifier in response to the common mode noise current;

a capacitor coupling said transistor stage and said ground return line;

said capacitor providing a cancellation current to said ground return line from said transistor stage to substantially cancel the common mode noise current in the ground return line; and further comprising:

a floating bias circuit coupled to said current sensor for receiving a signal representative of said common mode noise current, rectifying said signal and supplying a DC bias voltage to said amplifier.

21. The active filter of claim 20, wherein said current sensor and said transistor stage are coupled in a feedback arrangement wherein said transistor stage, said amplifier and said current sensor have a high amplitude gain.

22. The active filter of claim 20, wherein said current sensor and said transistor stage are coupled in a feed forward arrangement, wherein said transistor stage, said amplifier and said current sensor have an amplitude gain of approximately unity.

23. The active filter of claim 22, wherein said floating bias circuit and said amplifier are both connected to a secondary of said current transformer.

24. The active filter of claim 20, wherein said floating bias circuit and said amplifier are both connected to a secondary of said current transformer.

25. The active filter of claim 20, wherein said floating bias circuit and said amplifier are coupled respectively to a first secondary and a second secondary of said current transformer.

* * * * *